(12) United States Patent
Nakatsuka

(10) Patent No.: US 6,229,625 B1
(45) Date of Patent: May 8, 2001

(54) APPARATUS FOR DETERMINING IMAGE PROCESSING PARAMETER, METHOD OF THE SAME, AND COMPUTER PROGRAM PRODUCT FOR REALIZING THE METHOD

(75) Inventor: Kimihiro Nakatsuka, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 09/107,854

(22) Filed: Jun. 30, 1998

(30) Foreign Application Priority Data

Jul. 4, 1997 (JP) .................................................. 9-195148

(51) Int. Cl.$^7$ ............................ G06K 15/02; H04N 1/40; H04N 1/50; H04N 1/60
(52) U.S. Cl. ............................ 358/1.9; 358/518; 358/448
(58) Field of Search ............................ 358/1.9, 463, 455, 358/521, 456, 451, 518, 448, 452, 401, 501; 382/275, 298, 299, 237

(56) References Cited

U.S. PATENT DOCUMENTS

| | | | | |
|---|---|---|---|---|
| 5,164,837 | * | 11/1992 | Hirosawa et al. | 358/1.9 |
| 5,177,625 | * | 1/1993 | Nakashima et al. | 382/275 |
| 5,339,365 | * | 8/1994 | Kawai et al. | 382/298 |
| 5,751,450 | * | 5/1998 | Robinson et al. | 358/455 |

FOREIGN PATENT DOCUMENTS 4-144361   5/1992   (JP) .

* cited by examiner

Primary Examiner—Scott Rogers
(74) Attorney, Agent, or Firm—Ostrolenk, Faber, Gerb & Soffen, LLP

(57) ABSTRACT

The technique of the present invention enables even an unskilled operator in the field of image processing to give a high-quality image. An image processing parameter inferring unit 106 specifies an image processing parameter P based on image characteristic information d1 representing characteristics of an image of an original, a subject keyword d2, and a finishing keyword d3. When the operator instructs a change of the specified image processing parameter P in a dialog box, a parameter correction value inferring unit 108 infers a correction value of the image processing parameter P based on fine adjustment data d4 representing a quantity of fine adjustment corresponding to the instructed change and the keywords d1 and d2. The quantity of fine adjustment and the inferred correction value may depend upon the type of a subject on the original. The structure of the present invention estimates the correction value, which is varied with a variation in quantity of fine adjustment, based on the subject keyword d2 and the finishing keyword d3. This accordingly enables adjustment of the correction value according to the subject of the image.

23 Claims, 7 Drawing Sheets

APPARATUS FOR DETERMINING IMAGE PROCESSING PARAMETER, METHOD OF THE SAME, AND COMPUTER PROGRAM PRODUCT FOR REALIZING THE METHOD

BACKGROUND OF THE INVENTION

1. Field of the Invention

The present invention relates to a technique of determining image processing parameters set in an image conversion device which converts image data of an original into image recording data.

2. Description of the Related Art

In an image conversion device that converts image data representing an image of an original into image recording data, the general technique causes the image of the original to be subjected to a variety of image processing operations, such as elimination of noise, color conversion, tone change, size alteration, and sharpening of the image, so as to give a high-quality image. The contents of the image processing are not fixed but varied according to the original and the requirements of the user for the desired output image. The conditions defining the contents of the image processing are set in the form of image processing parameters in an image processing apparatus. Optimum adjustment of these image processing parameters enables output of a high-quality image.

An apparatus has been proposed to improve the quality of the output image in this image conversion device. The proposed apparatus sets image processing parameters based on predetermined parameter conversion rules in the image conversion device and carries out image conversion with the image processing parameters. The operator evaluates a resulting recorded image and inputs corrected image processing parameters based on the result of evaluation. The parameter conversion rules are then modified to realize the corrected image processing parameters. This proposed structure enables the image processing parameters to be corrected according to the inputs of the user and gives a high-quality image that adequately reflects the requirement of the user.

The proposed apparatus, however, has the structure that requires the operator to directly input the corrected image processing parameters and thereby needs a skilled operator in the field of image processing. The quantity of adjustment of the picture quality which the operator requires based on the recorded image is correlated to the actually required variation of the corrected image processing parameters. There is, however, a subtle difference in the correlation among the subjects (for example, figures, still life, and landscape) of the original, and some skill is required to discriminate such a difference.

SUMMARY OF THE INVENTION

The object of the present invention is thus to enable even an unskilled operator in the field of image processing to give a high-quality image.

At least part of the above and the other related objects is realized by an apparatus for determining an image processing parameter set in an image conversion device which converts image data of an original into image recording data. The apparatus includes: an image information generating unit which analyzes the image data of the original and thereby generates specific information representing a characteristic of an image of the original, the specific information affecting a level of the image processing parameter; a first input unit which receives a keyword representing a condition to be referred to in the process of recording the image of the original; an inferring unit which infers the image processing parameter on the basis of the information and the input keyword; a second input unit which receives data representing a magnitude of a parameter adjuster that adjust the level of the image processing parameter; a correction value inferring unit which infers a correction value of the image processing parameter on the basis of the magnitude of the parameter adjuster and the input keyword; and a correction unit which corrects the image processing parameter inferred by the inferring unit on the basis of the correction value to obtain a corrected image processing parameter as the image processing parameter to be used in the image conversion device.

In the apparatus of the present invention, the inferring unit infers the image processing parameter based on the specific information representing a characteristic of the image of the original and the keyword. When the operator operates the parameter adjuster to adjust the level of the specified image processing parameter, the correction value inferring unit infers the correction value of the image processing parameter on the basis of the magnitude of the parameter adjuster and the keyword. The correction value reflects the magnitude of the parameter adjuster as well as the keyword. The correction unit corrects the image processing parameter on the basis of the correction value.

When the operator simply instructs a change of the image processing parameter through operation of the parameter adjuster, the apparatus of this structure infers the image processing parameter that reflects the keyword with respect to the image of the original. This structure enables even an unskilled operator in the field of image processing to determine the optimum image processing parameter.

In accordance with one preferable application, the apparatus further includes: a first setting unit which sets the image processing parameter inferred by the inferring unit into the image conversion device; a first display control unit which displays an image responsive to the image recording data output from the image conversion device on a display device according to the image processing parameter set by the first setting unit; a second setting unit which sets the corrected image processing parameter corrected by the correction unit into the image conversion device; and a second display control unit which displays the image recording data output from the image conversion device on the display device according to the corrected image processing parameter set by the second setting unit.

The operator checks the image recording data displayed on the display unit for the degree of the image processing parameter with respect to the image recording data. The operator thus simply operates the parameter adjuster according to the desired degree of the image processing parameter.

The apparatus of this structure may further include: an instruction input unit which receives an external operation instruction; and a switching control unit which selects and activates one of the first display control unit and the second display control unit in response to the operation instruction.

This structure enables selection of a desired image out of the images before and after the correction of the image processing parameter and display of the desired image on the display unit, in response to the external operation instruction. The operator can thus readily compare the image after the correction with the image before the correction and accurately evaluate the image after the correction.

In accordance with another preferable application, the apparatus further includes a correction value averaging unit which, when the data representing the magnitude of the parameter adjuster is input into the second input unit plural times, calculates an average of a plurality of the corrected values obtained by the correction value inferring unit and supplies the averaged correction value to the correction unit.

This structure gives the mean of the past data of the correction values. The mean represents the tendency of the user.

In accordance with one preferable structure of the apparatus, the inferring unit infers the image processing parameter according to a fuzzy logic. The fuzzy logic gives a compromising conclusion based on the composite information and enables highly accurate inference.

In accordance with another preferable structure of the apparatus, the keyword input into the first input unit has a first keyword indicative of a type of an object of the original picture and a second keyword indicative of a finishing state of the image recording data. This structure gives the image processing parameter based on the type of the object and the finishing state of the image recording data.

The present invention is also directed to a method of determining an image processing parameter set in an image conversion device which converts image data of an original into image recording data. The method includes the steps of:

(a) analyzing the image data of the original and thereby generating specific information representing a characteristic of an image of the original, the specific information affecting a level of the image processing parameter;

(b) receiving a keyword that represents a condition to be referred to in the process of recording the image of the original;

(c) inferring the image processing parameter on the basis of the information and the input keyword;

(d) receiving data which represents a magnitude of a parameter adjuster that adjust the level of the image processing parameter;

(e) inferring a correction value of the image processing parameter on the basis of the magnitude of the parameter adjuster and the input keyword; and (f) correcting the image processing parameter inferred by the step (c) on the basis of the correction value to obtain a corrected image processing parameter as the image processing parameter to be used in the image conversion device.

Like the apparatus discussed above, the method of the present invention enables even an unskilled operator in the field of image processing to determine the optimum image processing parameter.

The present invention is also directed to a computer program product for determining an image processing parameter set in an image conversion device which converts image data of an original into image recording data. The computer program product includes:

a computer readable medium;

a first program code unit which causes a computer to analyze the image data of the original and thereby generates specific information representing a characteristic of an image of the original, the specific information affecting a level of the image processing parameter;

a second program code unit which causes the computer to receive a keyword representing a condition to be referred to in the process of recording the image of the original;

a third program code unit which causes the computer to infer the image processing parameter on the basis of the information and the input keyword;

a fourth program code unit which causes the computer to receive data representing a magnitude of a parameter adjuster that adjust the level of the image processing parameter;

a fifth program code unit which causes the computer to infer a correction value of the image processing parameter on the basis of the magnitude of the parameter adjuster and the input keyword; and a sixth program code unit which causes the computer to correct the image processing parameter inferred by the third program code unit on the basis of the correction value to obtain a corrected image processing parameter as the image processing parameter to be used in the image conversion device, wherein each of the program code units is recorded on the computer readable medium.

Like the apparatus and the method discussed above, the computer program product of the present invention enables even an unskilled operator in the field of image processing to determine the optimum image processing parameter.

These and other objects, features, aspects, and advantages of the present invention will become more apparent from the following detailed description of the preferred embodiment with the accompanying drawings.

DESCRIPTION OF THE PREFERRED EMBODIMENTS

One mode of carrying out the present invention is described below as a preferred embodiment.

A. Structure of Apparatus and Outline of Operation

Figure 1:
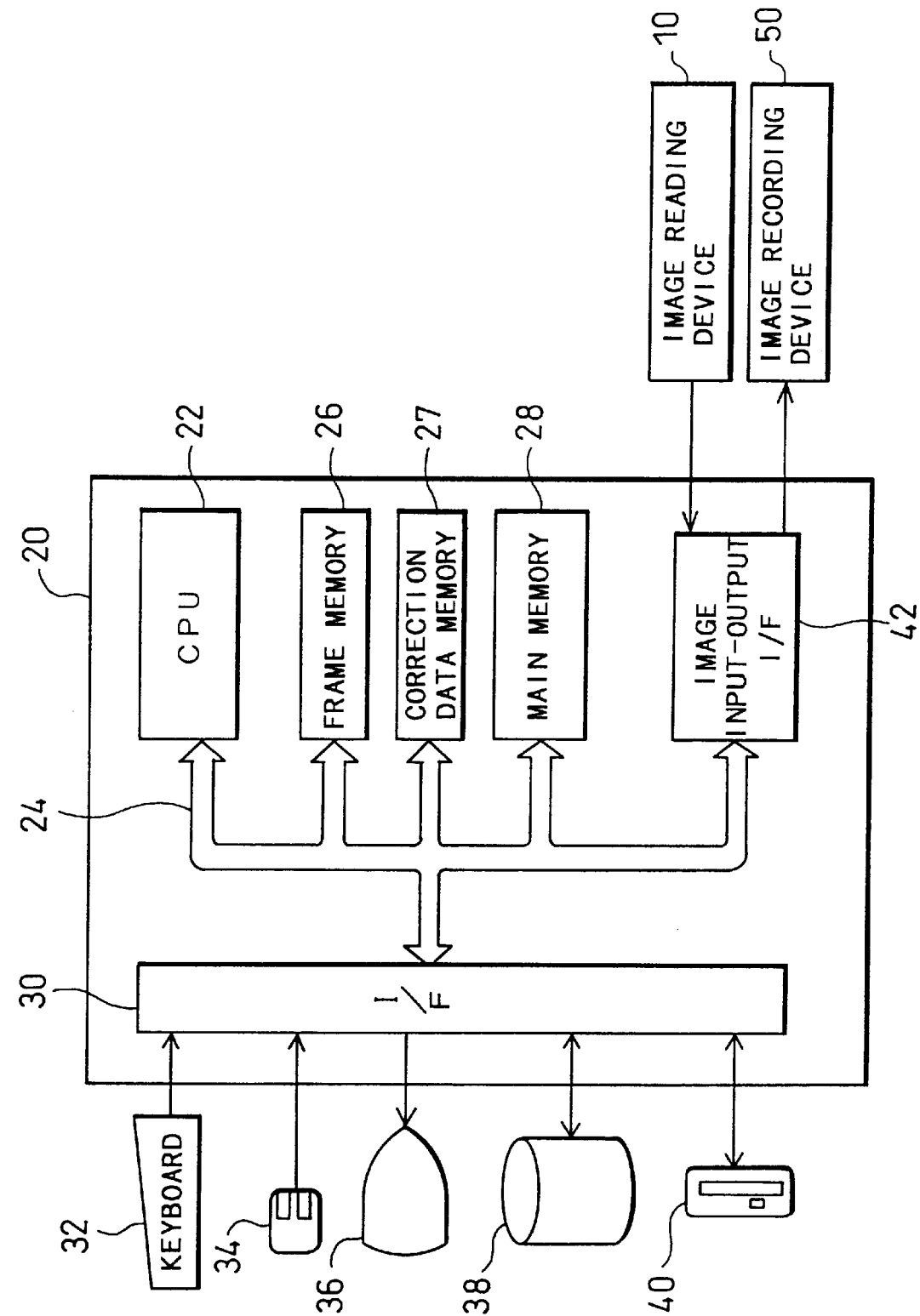
FIG. 1 is a block diagram illustrating structure of an image processing system with an apparatus for determining image processing parameters incorporated therein as one embodiment according to the present invention.

FIG. 1 is a block diagram illustrating structure of an image processing system with an apparatus for determining image processing parameters incorporated therein as one embodiment according to the present invention. The image processing system includes an image reading device 10, an image processing apparatus 20, and an image recording device 50. The image reading device 10 is realized, for example, by an input scanner or a digital camera that reads image data of a color image. The image reading device 10 outputs image data (R, G, and B signals) DR, DG, and DB of the respective. color components obtained by scanning an image of an original by every pixel. The image reading device 10 may otherwise be realized by a magnetic disk in which image data are stored or in the form of a network communicated with another device via a communications line.

The image processing apparatus 20 is realized by a computer system, such as a work station or a personal computer. The image processing apparatus 20 converts the image data DR, DG, and DB input from the image reading device 10 into image recording data DY, DM, DC, and DK of Y, M, C, and K. The resulting image data DY, DM, DC, and DK are transmitted to the image recording device 50.

The image recording device 50 is realized, for example, by an imagesetter or a color printer that records image data. In the case of the imagesetter, for example, the image recording data DY, DM, DC, and DK output from the image processing apparatus 20 are further converted into halftone image signals. The halftone image signals are recorded on a photosensitive film by ON/OFF modulation of an exposure laser beam, so as to give a color separation film on which images of the respective color components Y, M, C, and K are recorded. The image recording device 50 may otherwise be realized by a magnetic disk or in the form of a network communicated with another device via a communications line. In this case, the image recording data DY, DM, DC, and DK may be recorded or transferred without any further processing.

A CPU 22 of the image processing apparatus 20 is connected with a frame memory 26, a correction data memory 27, and a main memory 28 via a bus 24. A keyboard 32, a mouse 34 functioning as a pointing device, a color CRT 36 functioning as a display unit, and a hard disk drive 38 and a flexible drive 40 for temporarily storing a variety of data are connected to the image processing apparatus 20 via an input-output interface 30. The keyboard 32 and the mouse 34 function as the coordinate point input means for specifying coordinates of a fixed point and a moving point and as the input means for inputting keyword information discussed later. The image processing apparatus 20 is further connected to the image reading device 10 and the image recording device 50 via an image input-output interface 42.

The main memory 28 stores software (applications programs) that realize the respective functional units of the image processing apparatus 20 (more concretely, the functions of the inferring unit, the correction value inferring unit, the correction unit, and the image conversion device of the present invention). The CPU 22 executes the software to realize the functions of the respective units and the device, which will be described later in detail.

The software realizing the functions of these units and the device is recorded on a computer readable recording medium, such as a floppy disk or a CD-ROM. The computer reads the software from the recording medium and transfers the input software to an internal storage device (for example, the main memory 28) or an external storage device (for example, the hard disk drive 38 or the flexible drive 40). The software may otherwise be supplied to the computer via a communications network. By way of example, the image processing apparatus 20 is connected with a modem, which is further connected to a network including a server via a communications line. The server functions as a program supply device which supplies the software to the image processing apparatus 20 via the communications line.

The CPU 22 executes the computer programs stored in the internal storage device to realize the functions of the computer programs. Alternatively the computer directly reads and executes the computer programs recorded on the recording medium.

Figure 2:
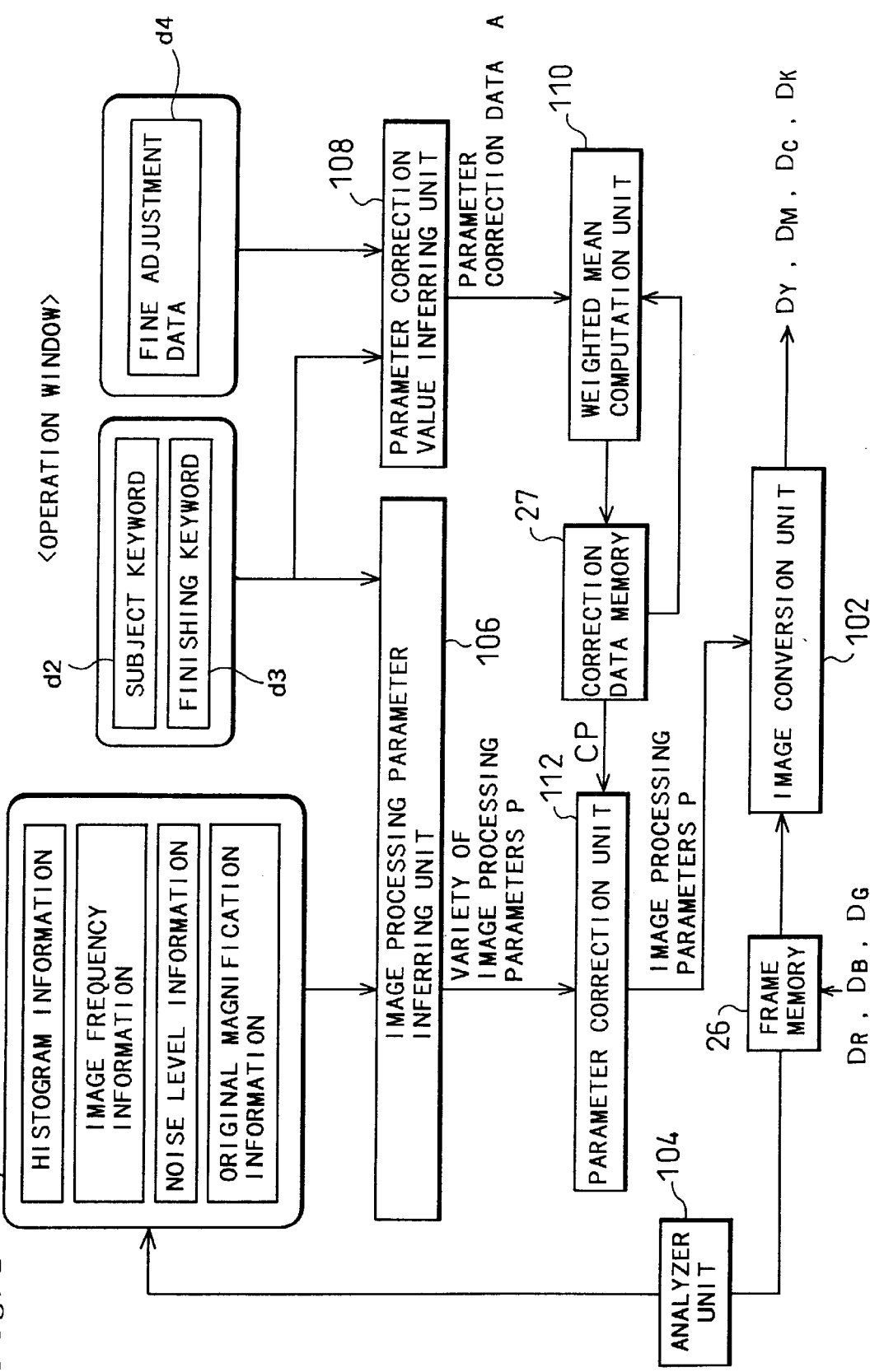
FIG. 2 is a functional block diagram showing functions of an image processing apparatus 20.

FIG. 2 is a functional block diagram showing the functions of the image processing apparatus 20. The CPU 22 executes the software to realize an image conversion unit 102, an analyzer unit 104, an image processing parameter inferring unit 106, a parameter correction value inferring unit 108, a weighted mean computation unit 110, and a parameter correction unit 112. The output signals DR, DG, and DB of the image reading device 10 (more specifically, image data pre-scanned for the purpose of reducing the number of pixels to be read) are once stored in the frame memory 26 and automatically analyzed by the analyzer unit 104 to give image characteristic information d1 (information representing the characteristics of the image of the original). The image characteristic information d1 includes histogram information, image frequency information, noise level information, and original magnification information.

The operator specifies conditions of image correction suitable for the respective images included in the image of the original to be recorded and inputs the suitable conditions as two keywords, a subject keyword d2 and a finishing keyword d3. The inputs correspond to the first input unit of the present invention and are carried out in the operation window displayed on the CRT 36 through operation of the mouse 34.

The image characteristic information d1, the subject keyword d2, and the finishing keyword d3 are transmitted to the image processing parameter inferring unit 106, which corresponds to the inferring unit of the present invention and infers a variety of image processing parameters P according to the fuzzy logic. The image processing parameters P are subsequently corrected with parameter correction data stored in the correction data memory 27 by the parameter correction unit 112, which corresponds to the correction unit of the present invention. The results of correction by the parameter correction unit 112 are transferred as the corrected image processing parameters P to the image conversion unit 102, which corresponds to the image conversion device of the present invention.

The image conversion unit 102 carries out color separation that adjusts the image data DR, DG, and DB stored in the frame memory 26 based on the image processing parameters P. The image recording data DY, DM, DC, and DK are output as the result of color separation. The image recording data DY, CM, DC, and DK are once transmitted to the CRT 36, and an image is displayed on the CRT 36 based on the image data DY, DM, DC, and DK. The operator checks the displayed image for the color, the tone, and the sharpness and inputs fine adjustment data d4 in the operation window displayed on the CRT 36. The inputs correspond to the second input unit of the present invention.

The fine adjustment data d4, the subject keyword d2, and the finishing keyword d3 are transmitted to the parameter correction value inferring unit 108, which corresponds to the correction value inferring unit of the present invention. The parameter correction value inferring unit 108 infers the quantities of fine adjustment on the variety of image processing parameters P inferred by the image processing parameter inferring unit 106 according to the fuzzy logic. The quantities of fine adjustment are transmitted as original parameter correction data A to the weighted mean computation unit 110, and the resulting values after the weighted mean computation are stored as final parameter correction data CP in the correction data memory 27.

The final parameter correction data CP stored in the correction data memory 27 are transmitted to the parameter correction unit 112 and used for the correction of the image processing parameters P as described above. The image recording data DY, DM, DC, and DK output from the image conversion unit 102 are accordingly those corrected with the fine adjustment data d4 input in the operation window. This enables an image on which the operator's intention is reflected to be recorded by the image recording device 50.

B. Details of Operation

Figure 3:
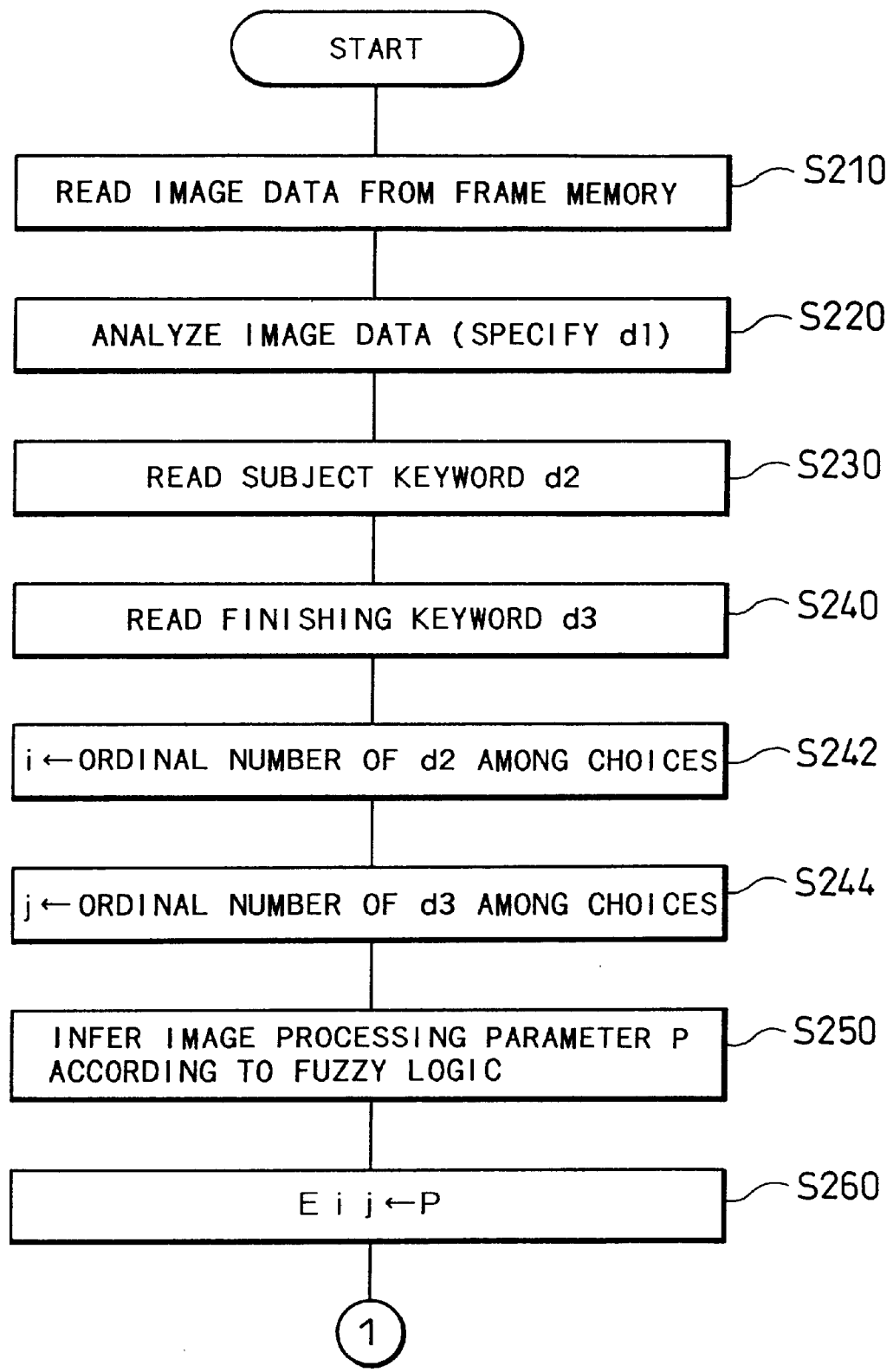
FIGS. 3 and 4 are flowcharts showing an image processing routine executed by a CPU 22 of the image processing apparatus 20.
Figure 4:
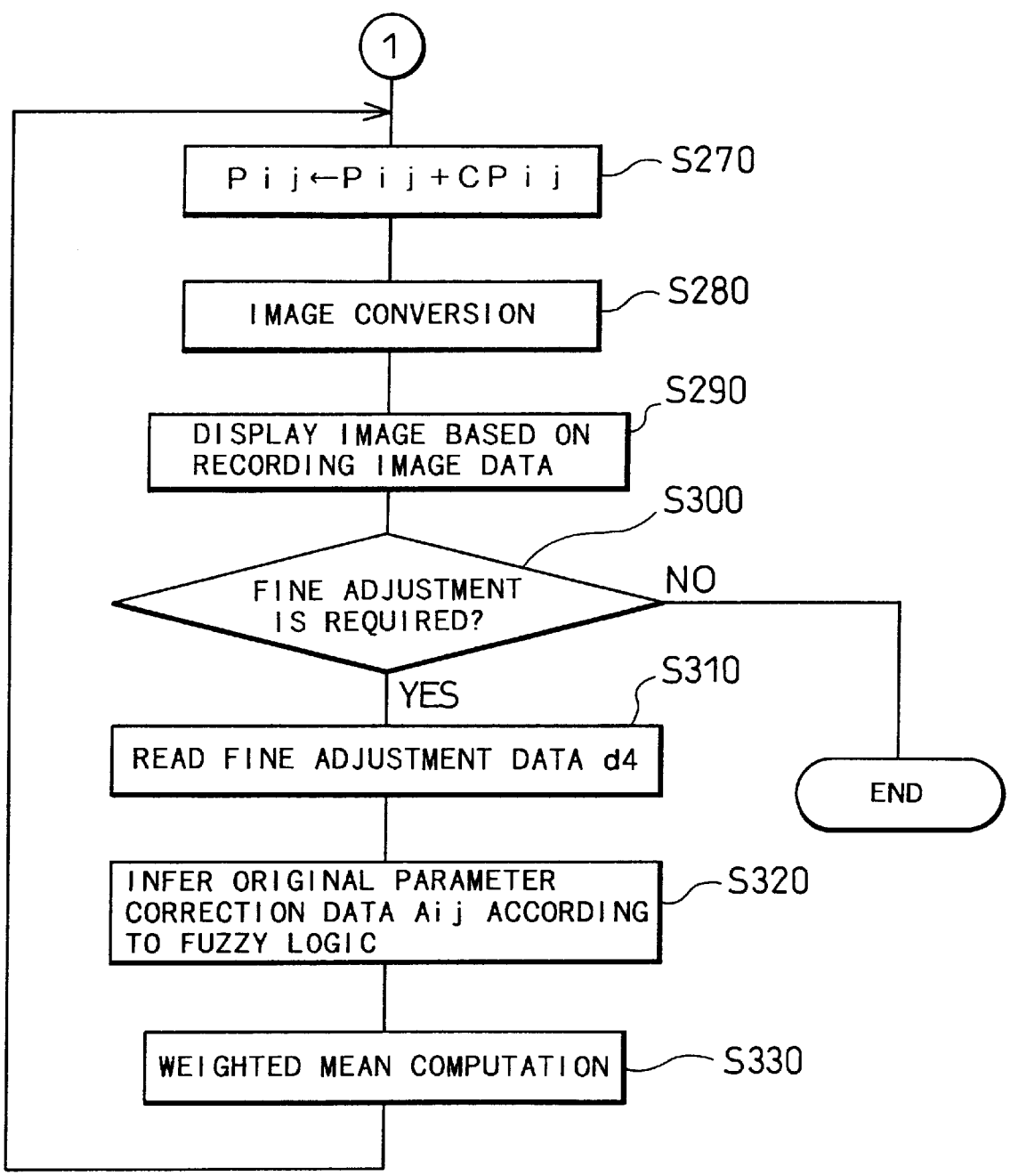

FIGS. 3 and 4 are flowcharts showing an image processing routine executed by the CPU 22 of the image processing apparatus 20. When the program enters the routine of FIG. 3, the CPU 22 first reads image data DR, DG, and DB from the frame memory 26 at step S210. By way of example, the image data DR, DG, and DB are obtained by pre-scanning an original with the image processing apparatus 10, such as a scanner. The CPU 22 then analyzes the input image data DR, DG, and DB and specifies image characteristic information d1 representing the characteristics of an image of the original at step S220. The analysis corresponds to the analyzer unit 104 shown in the block diagram of FIG. 2, and the image characteristic information d1 thus obtained includes histogram information, image frequency information, noise level information, and original magnification information.

The CPU 22 then reads the subject keyword d2 and the finishing keyword d3, which are the conditions of image correction suitable for the respective images included in the image of the original to be recorded, at steps S230 and S240. The operator specifies the keywords d2 and d3 in the operation window displayed on the CRT 36 through operation of the mouse 34 as discussed below.

Figure 5:
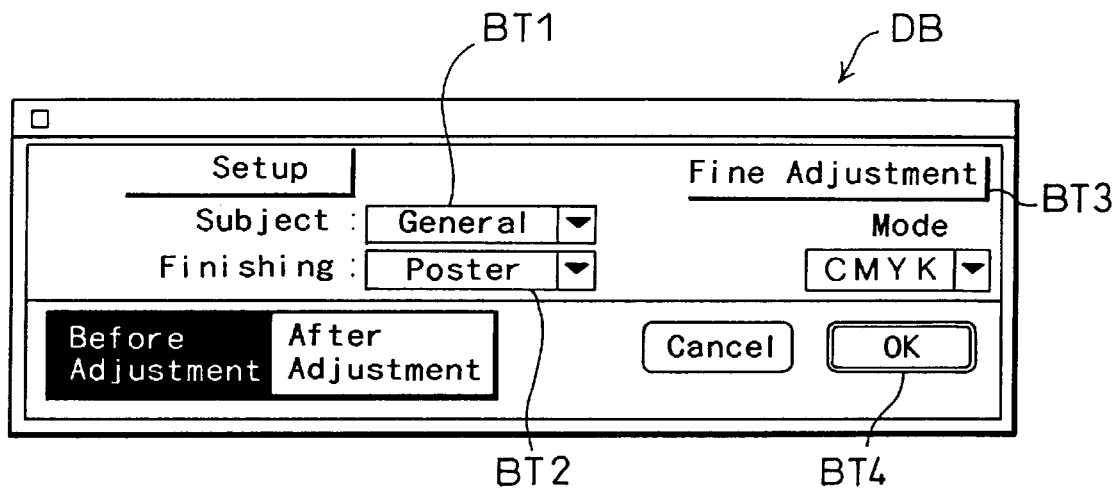
FIG. 5 shows a dialog box DB displayed in the operation window for inputting a subject keyword d2 and a finishing keyword d3.
Figure 6:
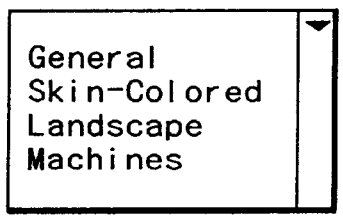
FIG. 6 shows a set of choices for the subject keyword d2.
Figure 7:
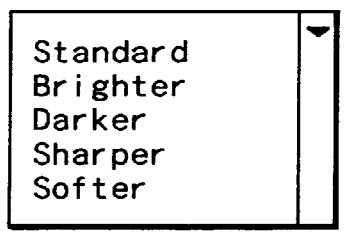
FIG. 7 shows a set of choices for the finishing keyword d3.

FIG. 5 shows a dialog box DB displayed in the operation window for inputting the subject keyword d2 and the finishing keyword d3. The operator clicks a 'Subject Selection' button BT1 with the mouse 34 to select the subject keyword d2 representing the subject of the image among a set of choices, for example, 'General', 'Skin-Colored', 'Landscape', and 'Machines' as shown in FIG. 6. The operator also clicks a 'Finishing Selection' button BT2 with the mouse 34 to select the finishing keyword d3 representing the finishing state among a set of choices using general adjectives, for example, 'Standard', 'Brighter', 'Darker', 'Sharper', and 'Softer' as shown in FIG. 7.

Referring back to the flowchart of FIG. 3, the CPU 22 sets an ordinal number of the subject keyword d2 input at step S230 in the set of choices to a variable i at step S242, and subsequently sets an ordinal number of the finishing keyword d3 input at step S240 in the set of choices to a variable j at step S244. By way of example, when a choice 'Skin-Colored' is selected as the subject keyword d2 among the choices shown in FIG. 6, the variable i is set equal to two. When a choice 'Sharper' is selected as the finishing keyword d3 among the choices shown in FIG. 7, the variable j is set equal to four. The CPU 22 then infers an image processing parameter P according to a fuzzy logic at step S250.

The following describes the details of the processing executed at step S250. The processing of step S250 corresponds to the image processing parameter inferring unit 106 shown in the block diagram of FIG. 2. The process uses the image characteristic information d1 specified at step S220 and the subject keyword d2 and the finishing keyword d3 respectively input at steps S230 and S240 as the input information and infers a variety of image processing parameters P, which are required for obtaining an appropriate processed image, according to the fuzzy logic. Examples of the image processing affected by the image processing parameters P inferred here include (1) pre-treatment, for example, elimination of noise, (2) change of the dynamic range of the image, for example, change of highlighted points and shadowed points and change of the tone, (3) color correction, and (4) image sharpening process, for example, unsharp masking (USM).

The input information including the image characteristic information d1, the subject keyword d2, and the finishing keyword d3 is highly abstractive information, whereas the image processing parameters P given as the output information are concrete information. The processing of step S250 accordingly functions as an interpreter of the highly abstractive information into the concrete information. It is required to transplant decision processes of a skilled operator to the interpreter. The decision processes are expressed by fuzzy production rules, which are stored in advance in the main memory 28.

The following describes one example of the fuzzy production rules. It is here assumed that the inferred image processing parameter is the degree of sharpness (sharpness gain) and that the 'Skin-Colored' and the 'Sharper' are respectively selected as the subject keyword d2 and the finishing keyword d3. By way of example, the following fuzzy production rules may be used for inferring the image processing parameter P based on such input information:

If the subject is 'Skin-Colored', then set the sharpness gain to 'Slightly Lower'.

If the finishing is 'Sharper', then set the sharpness gain to 'Slightly Higher'.

When the noise level information of the image characteristic information d1 represents the 'Slightly High Level', the following fuzzy production rules may be used for inferring the image processing parameter P:

If the noise level is 'Slightly High Level', then set the sharpness gain to 'Lower'.

In this example, the image processing parameter P representing the sharpness gain is compromisingly inferred according to the above fuzzy production rules at step S250 in the flowchart of FIG. 3.

The image processing parameter P inferred at step S250 is then stored in a predetermined data area in the main memory 28 at step S260. The main memory 28 includes an mxn data array E11, E12, ..., E1n, E21, E22, ..., E2n, ..., Em1, Em2, ... Emn, where m denotes the number of choices for the subject keywords d2 and n denotes the number of choices for the finishing keyword d3. In accordance with a concrete procedure of step S260, the CPU 22 selects an element of the array (data area) Eij defined by the variables i and j set at steps S242 and S244 among the data array E11 through Emn, and stores the image processing parameter P in the selected data area Eij. The image processing parameter P stored in the data area Eij is hereinafter expressed as Pij.

Referring to the flowchart of FIG. 4, the CPU 22 then adds final parameter correction data CPij to the image processing parameter Pij stored in the data area Eij at step S270. The final parameter correction data CPij represents data stored in an element defined by the variables i and j among an mxn data array stored in the correction data memory 27, and is updated by the processing of step S330 discussed later. At the time when the program proceeds from step S260 to step S270, the final parameter correction data CPij is set equal to zero, which is an initial value when the image processing routine is activated. The addition of step S270 accordingly does not affect the value of the image processing parameter Pij.

The program then proceeds to step S280 to carry out an image conversion process. The image conversion process corresponds to the image conversion unit 102 shown in the block diagram of FIG. 2. The image conversion process carried out here is color separation which converts the image data DR, DG, and DB read at step S210 into image recording data DY, DM, DC, and DK using the image processing parameter Pij. The image recording data DY, DM, DC, and DK are transmitted to the CRT 36, on which an image is displayed based on the image recording data DY, DM, DC, and DK at step S290.

The operator checks the image displayed on the CRT 36 for the color, the tone, and the sharpness of the image and determines whether or not fine adjustment is required at step S300. When the operator clicks a 'Fine Adjustment' button BT3 in the dialog box DB shown in FIG. 5, the CPU 22 determines requirement of fine adjustment. When the operator clicks an 'OK' button BT4 in the dialog box DB, on the other hand, the CPU 22 determines non-requirement of fine adjustment. When it is determined that fine adjustment is required at step S300, the program proceeds to step S310.

Figure 8:
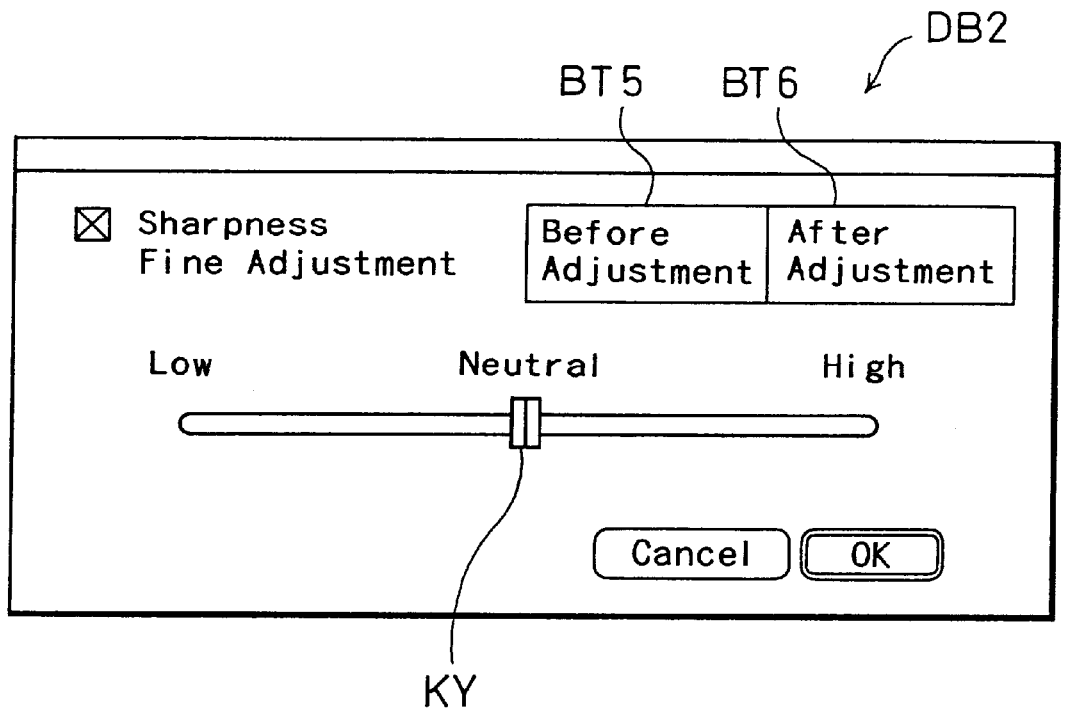
FIG. 8 illustrates a dialog box DB2 displayed in the operation window for inputting fine adjustment data d4.

The CPU 22 displays an operation window for inputting fine adjustment data d4 on the CRT 36 at step S310. FIG. 8 illustrates a dialog box DB2 displayed in the operation window an for inputting the fine adjustment data d4. The operator slides a slide key KY with the mouse 34 to set a desired change of the sharpness gain to the higher level or to the lower level. The CPU 22 reads the desired change of the sharpness gain as the fine adjustment data d4 at step S310. The CPU 22 then infers original parameter correction data Aij according to the fuzzy logic at step S320.

The processing of step S320 corresponds to the parameter correction value inferring unit 108 shown in the block diagram of FIG. 2. The process uses the subject keyword d2 and the finishing keyword d3 read at steps S230 and S240 and the fine adjustment data d4 read at step S310 as the input information and infers the original parameter correction data Aij required for correcting the image processing parameter P inferred at step S250 according to the fuzzy logic.

Figure 9:
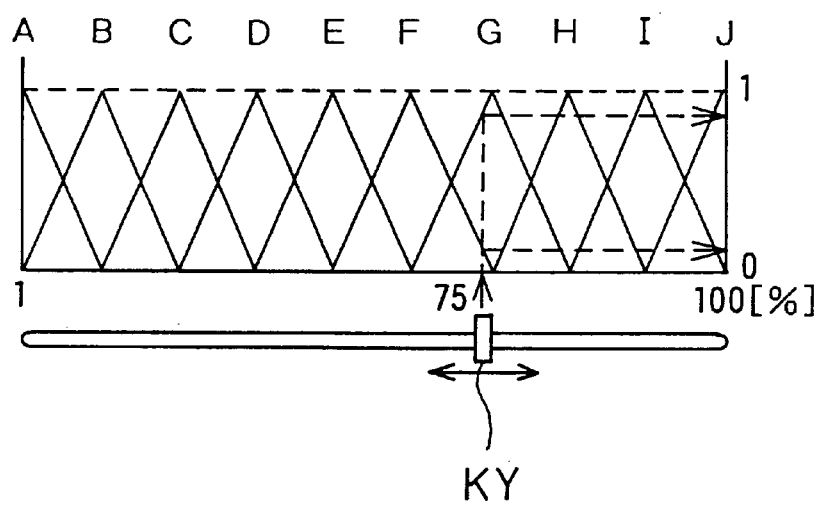
FIG. 9 shows a variation in membership function of the fine adjustment data d4 against the position of a slide key KY.

The fuzzy logic used here is, for example, the fuzzy production rules given below. The fine adjustment data d4 is used as the antecedent of the fuzzy production rules. FIG. 9 shows a variation in membership function of the fine adjustment data d4 against the position of the slide key KY. By way of example, when the slide key KY is at the position of 75[%] as shown in FIG. 9, the membership function gives definition functions G and F on the abscissa of the graph. When the definition function G or F is used as the antecedent and the 'Skin-Colored' is selected as the subject keyword d2, the following fuzzy function rules may be used for inferring the original parameter correction data Aij:

If the amount of fine adjustment is F and the subject is 'Skin-Colored', then set the sharpness gain correction value equal to '+1'.

If the amount of fine adjustment is G and the subject is 'Skin-Colored', then set the sharpness gain correction value equal to '+2'.

One exemplified procedure of step S320 compromisingly infers the original parameter correction data Aij according to these fuzzy production rules. Like the final parameter correction data CPij, the original parameter correction data Aij is stored in an element defined by the variables i and j among an mxn data array.

After inferring the original parameter correction data Aij at step S320, the CPU 22 carries out a weighted mean computation process at step S330. The weighted mean computation process weights the final parameter correction data CPij stored in the correction data memory 27 and calculates the mean of the weighted final parameter correction data CPij and the inferred original parameter correction data Aij. The details of the weighted mean computation process are described below.

Figure 10:
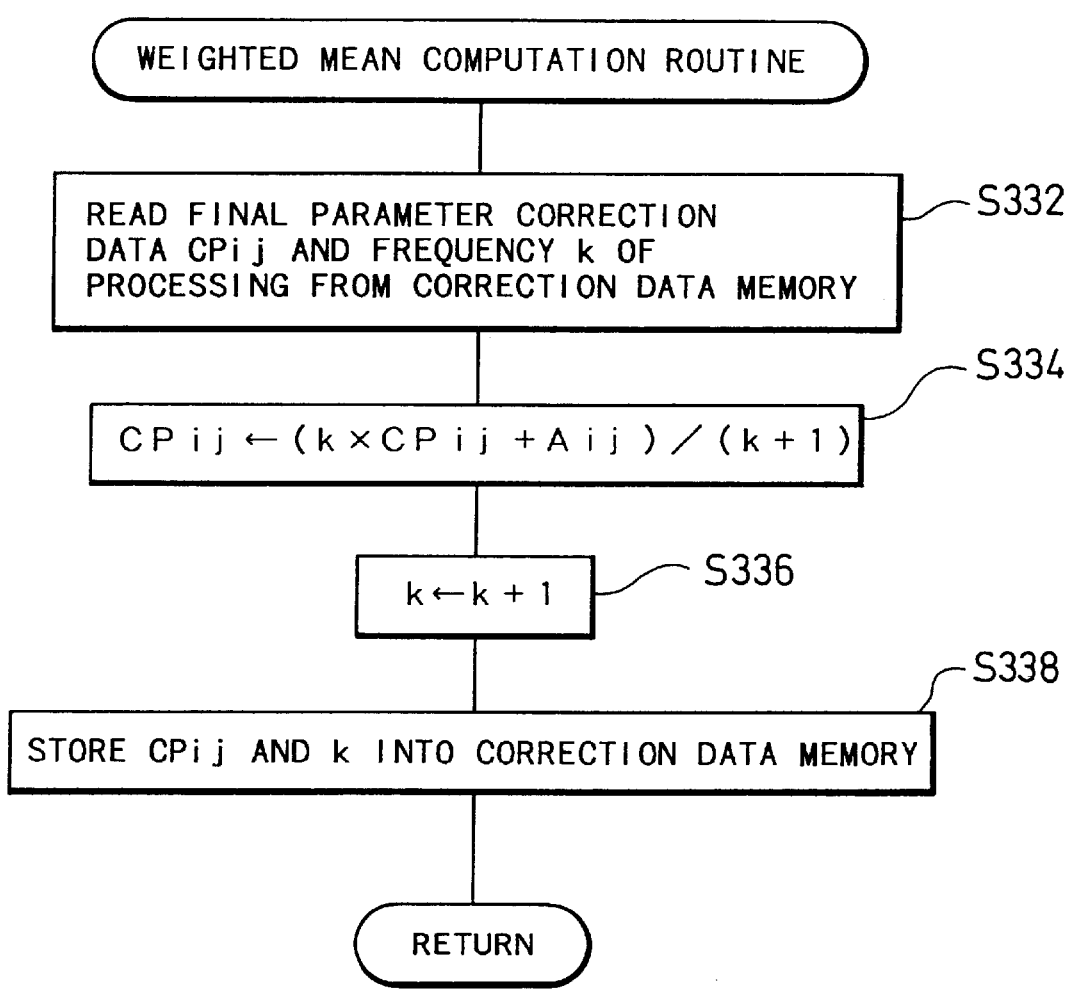
FIG. 10 is a flowchart showing a weighted mean computation process executed in response to a subroutine call at step S330 in the flowchart of FIG. 4.

FIG. 10 is a flowchart showing a weighted mean computation process executed in response to a subroutine call at step S330 in the flowchart of FIG. 4. When the program enters the weighted mean computation routine of FIG. 10, the CPU 22 first reads the final parameter correction data CPij stored in the correction data memory 27 in the previous cycle of this routine at step S332. Each piece of the final parameter correction data CPij stored in the correction data memory 27 is mapped to a frequency k of updating (processing) the piece of the final parameter correction data CPij, which is stored in the correction data memory 27 at step S338 as discussed later. At step S332, the final parameter correction data CPij as well as the frequency k of processing is read from the correction data memory 27.

At subsequent step S334, the CPU 22 substitutes the final parameter correction data CPij and the frequency k of processing read from the correction data memory 27 and the original parameter correction data Aij inferred at step S320 into Equation (1) given below, so as to update the final parameter correction data CPij.

$$CPij = (k \times CPij + Aij)/(k+1) \qquad (1)$$

Equation (1) gives the weight of the frequency k of pressing to the previous final parameter correction data CPij and the weight of 1 to the original parameter correction data Aij inferred at step S320 and calculates the mean of the weighted values. The frequency k of processing is incremented by one at step S336. The mean value is stored as the updated final parameter correction data CPij together with the incremented frequency k of processing in the data area defined by the variables i and j in the correction data memory 27. The program then exits from this weighted mean computation routine of FIG. 10.

Referring back to the flowchart of FIG. 4, after the weighted mean computation process at step S330, the program returns to step S270. The CPU 22 adds the updated final parameter correction data CPij obtained at step S330 to the image processing parameter Pij, so as to determine a new image processing parameter Pij at step S270. The program then proceeds to steps S280 and S290 to carry out the image conversion with the new image processing parameter Pij and display an image expressed by the converted image recording data on the CRT 36. The operator can evaluate the resulting image after fine adjustment in the dialog box DB2 shown in FIG. 5.

In case that the operator is not satisfied with the resulting image after fine adjustment, the program determines requirement of fine adjustment at step S300 and proceeds to step S310 to carry out further adjustment of the image. In case that the operator is satisfied with the resulting image after fine adjustment, on the other hand, the program determines non-requirement of fine adjustment and exits from the image processing routine.

When the operator clicks a 'Before Adjustment' button BT5 in the dialog box DB2 shown in FIG. 8, an image is displayed on the CRT 36 based on the image recording data before fine adjustment. When the operator clicks an 'After Adjustment' button BT6 in the dialog box DB2, on the other hand, an image is displayed on the CRT 36 based on the image recording data after fine adjustment. These processes are omitted from the flowchart of FIG. 4.

This structure enables selection and display of a desired image out of the images before and after fine adjustment in response to a simple click of the button, thereby facilitating the comparison between the images before and after fine adjustment. The operator can thus accurately evaluate the image after fine adjustment.

In the apparatus for determining the image processing parameters of the embodiment discussed above, the image processing parameter Pij is inferred from the image characteristic information d1 representing the characteristics of the image of the original, the subject keyword d2, and the finishing keyword d3. When the operator instructs a change of the inferred image processing parameter Pij in the dialog box DB2, the correction value of the image processing parameter is inferred from the quantity of fine adjustment and the keywords d2 and d3. The quantity of fine adjustment and the inferred correction value may depend upon the subject of the image. By way of example, the remarkably enhanced sharpness in the skin-colored subject causes undesirable roughness of the image. In this case, it is required to decrease the correction value corresponding to the quantity of fine adjustment, compared with the other subjects. The structure of the embodiment infers the correction value corresponding to the quantity of fine adjustment based on the subject keyword d2 and the finishing keyword d3, thus enabling adjustment of the correction value according to the subject of the image.

This structure requires the operator to simply instruct an increase or a decrease in image processing parameter in the operation window, for example, in the dialog box DB2 shown in FIG. 8. The image processing parameter that reflects the specified keywords regarding the image of the original is determined in response to the instruction. The structure of the embodiment enables even an unskilled operator in the field of image processing to determine the optimum image processing parameters required for the image processing.

The technique of the embodiment gives the weight of the frequency k of pressing to the previous final parameter correction data CPij and the weight of 1 to the newly inferred original parameter correction data Aij and calculates the mean of the weighted values, so as to update the final parameter correction data CPij. This procedure gives the mean of the past data of the correction values with respect to each combination of the keywords d2 and d3. The mean converges with an increase in frequency of processing and represents the tendency of the user. This arrangement thus enables a high-quality image adequately reflecting the requirement of the user to be obtained simply by changing the input of the fine adjustment data d4.

The fuzzy logic is applied for the inference in the above embodiment. The fuzzy logic gives a compromising conclusion based on the composite information and enables highly accurate inference. The conventional AI setup is faithful to the original. The original requiring a significant tone correction in the set up, for example, the overexposed or underexposed original, accordingly results in inadequate setup. In the conventional AI setup, the parameters required for the setup are related to one another in a complicated manner and are thus not readily specified by the operator. Another cause of the inadequate setup is that many parameters are fixed for the automatic setup. The structure of the embodiment infers the image processing parameter according to the fuzzy logic based on the keywords input by the operator. This structure enables both the faithful setup to the original and the significant change of the image processing parameters according to the requirements of the original.

In case that the target of processing, for example, the image reading device 10 or the image recording device 50, is changed, the fuzzy logic includes different fuzzy production rules.

In the above embodiment, the two keywords, that is, the subject keyword d2 and the finishing keyword d3, are input as the first input unit of the present invention. Another possible application inputs either one of these two keywords d2 and d3. Still another possible application inputs one or more additional keywords, for example, a keyword representing the exposure state, such as underexposure or overexposure, in addition to these two keywords d2 and d3. The principle of the present invention is not restricted to the process scanner discussed in the embodiment, but is applicable to any apparatuses which convert an image of an original into image recording data and reproduce the image, for example, printers, facsimiles, copying machines, and electronic bulletin boards.

The present invention is not restricted to the above embodiment or its modifications, but there may be many other modifications, changes, and alterations without departing from the scope or spirit of the main characteristics of the present invention.

It should be clearly understood that the above embodiment is only illustrative and not restrictive in any sense. The scope and spirit of the present invention are limited only by the terms of the appended claims.

What is claimed is:

1. An apparatus for determining an image processing parameter used in an image conversion device which converts image data of an original into image recording data, said apparatus comprising:

an image information generating unit which analyzes the image data of said original and thereby generates specific information representing a characteristic of an image of said original, said specific information affecting a level of the image processing parameter;

a first input unit which receives a keyword representing a condition to be referred to in the process of recording the image of said original;

an inferring unit which infers the image processing parameter on the basis of the information and the received keyword;

a second input unit which receives adjustment data used to correct the image processing parameter;

a correction value inferring unit which infers a correction value of the image processing parameter based on the keyword and the adjustment data; and a correction unit which corrects the image processing parameter inferred by said inferring unit on the basis of the correction value to obtain a corrected image processing parameter as the image processing parameter to be used in said image conversion device.

2. An apparatus in accordance with claim 1, said apparatus further comprising:

a first setting unit which sets the image processing parameter inferred by said inferring unit into said image conversion device;

a first display control unit which displays an image responsive to the image recording data output from said image conversion device on a display device according to the image processing parameter set by said first setting unit;

a second setting unit which sets the corrected image processing parameter corrected by said correction unit into said image conversion device; and a second display control unit which displays the image recording data output from said image conversion device on said display device according to the corrected image processing parameter set by said second setting unit.

3. An apparatus in accordance with claim 2, said apparatus further comprising:
an instruction input unit which receives an external operation instruction; and
a switching control unit which selects and activates one of said first display control unit and said second display control unit in response to the operation instruction.

4. An apparatus in accordance with claim 1, said apparatus further comprising:
a correction value averaging unit which, when the adjustment data is input into the second input unit plural times, calculates an average of a plurality of the corrected values obtained by said correction value inferring unit and supplies the averaged correction value to said correction unit.

5. An apparatus in accordance with claim 1, wherein said inferring unit infers the image processing parameter according to a fuzzy logic.

6. An apparatus in accordance with claim 1, wherein the keyword input into said first input unit includes a first keyword indicative of a type of an object of said original picture and a second keyword indicative of a finishing state of the image recording data.

7. A method of determining an image processing parameter used in an image conversion device which converts image data of an original into image recording data, said method comprising the steps of:
(a) analyzing the image data of said original and thereby generating specific information representing a characteristic of an image of said original, said specific information affecting a level of the image processing parameter;
(b) receiving a keyword that represents a condition to be referred to in the process of recording the image of said original;
(c) inferring the image processing parameter on the basis of the information and the received keyword;
(d) receiving data which represents adjustment data used to correct the image processing parameter;
(e) inferring a correction value of the image processing parameter based on the keyword and the adjustment data; and
(f) correcting the image processing parameter inferred by said step (c) on the basis of the correction value to obtain a corrected image processing parameter as the image processing parameter to be used in said image conversion device.

8. A method in accordance with claim 7, said method further comprising the steps of:
(g) setting the image processing parameter inferred in said step (c) into said image conversion device; and
(h) displaying an image responsive to the image recording data output from said image conversion device on a display device according to the image processing parameter set in said step (g).
(i) setting the corrected image processing parameter corrected in said step (f) into said image conversion device; and
(j) displaying the image recording data output from said image conversion device on said display device according to the image processing parameter set in said step (i).

9. A method in accordance with claim 8, said method further comprising the steps of:
(k) receiving an external operation instruction; and
(l) selecting and activating one of the display of said step (h) and the display of said step (j) in response to the operation.

10. A method in accordance with claim 7, said method further comprising the step of:
(m) when the adjustment data is input into the second input unit plural times, calculating an average of a plurality of the corrected values obtained in said step (e) and supplying the averaged correction value to be corrected in said step (f).

11. A method in accordance with claim 7, wherein said step (c) infers the image processing parameter according to a fuzzy logic.

12. A method in accordance with claim 7, wherein the keyword received in said step (b) includes a first keyword indicative of a type of an object of said original picture and a second keyword indicative of a finishing state of the image recording data.

13. A computer program product for determining an image processing parameter set in an image conversion device which converts image data of an original into image recording data, said computer program product comprising:
a computer readable medium;
a first program code unit which causes a computer to analyze the image data of said original and thereby generates specific information representing a characteristic of an image of said original, said specific information affecting a level of the image processing parameter;
a second program code unit which causes the computer to receive a keyword representing a condition to be referred to in the process of recording the image of said original;
a third program code unit which causes the computer to infer the image processing parameter on the basis of the information and the received keyword;
a fourth program code unit which causes the computer to receive adjustment data used to correct the level of the image processing parameter;
a fifth program code unit which causes the computer to infer a correction value of the image processing parameter based on the keyword received by the second program code unit and the adjustment data received by the fourth program code unit; and
a sixth program code unit which causes the computer to correct the image processing parameter inferred by said third program code unit on the basis of the correction value to obtain a corrected image processing parameter as the image processing parameter to be used in said image conversion device,
wherein each of said program code units is recorded on said computer readable medium.

14. An apparatus for determining an image processing parameter used in an image conversion device which converts image data of an original into image recording data, said apparatus comprising:
an image information generating unit which analyzes the image data of said original and thereby generates specific information representing a characteristic of an image of said original, said specific information affecting a level of the image processing parameter;
a first input unit which receives a keyword representing a condition to be referred to in the process of recording the image of said original;
an inferring unit which infers the image processing parameter on the basis of the information and the input keyword;

a second input unit which receives data representing a magnitude of a parameter adjuster that adjust the level of the image processing parameter;

a correction value inferring unit which infers a correction value of the image processing parameter on the basis of the magnitude of said parameter adjuster and the input keyword;

a correction unit which corrects the image processing parameter inferred by said inferring unit on the basis of the correction value to obtain a corrected image processing parameter as the image processing parameter to be used in said image conversion device; and a correction value averaging unit which, when the data representing the magnitude of the parameter adjuster is input into the second input unit plural times, calculates an average of a plurality of the corrected values obtained by said correction value inferring unit and supplies the averaged correction value to said correction unit.

15. An apparatus in accordance with claim 14, said apparatus further comprising:

a first setting unit which sets the image processing parameter inferred by said inferring unit into said image conversion device;

a first display control unit which displays an image responsive to the image recording data output from said image conversion device on a display device according to the image processing parameter set by said first setting unit;

a second setting unit which sets the corrected image processing parameter corrected by said correction unit into said image conversion device; and a second display control unit which displays the image recording data output from said image conversion device on said display device according to the corrected image processing parameter set by said second setting unit.

16. An apparatus in accordance with claim 15, said apparatus further comprising:

an instruction input unit which receives an external operation instruction; and a switching control unit which selects and activates one of said first display control unit and said second display control unit in response to the operation instruction.

17. An apparatus in accordance with claim 14, wherein said inferring unit infers the image processing parameter according to a fuzzy logic.

18. An apparatus in accordance with claim 14, wherein the keyword input into said first input unit includes a first keyword indicative of a type of an object of said original picture and a second keyword indicative of a finishing state of the image recording data.

19. A method of determining an image processing parameter used in an image conversion device which converts image data of an original into image recording data, said method comprising the steps of:

(a) analyzing the image data of said original and thereby generating specific information representing a characteristic of an image of said original, said specific information affecting a level of the image processing parameter;

(b) receiving a keyword that represents a condition to be referred to in the process of recording the image of said original;

(c) inferring the image processing parameter on the basis of the information and the received keyword;

(d) receiving data which represents a magnitude of a parameter adjuster that adjust the level of the image processing parameter;

(e) inferring a correction value of the image processing parameter on the basis of the magnitude of said parameter adjuster and the input keyword;

(f) correcting the image processing parameter inferred by said step (c) on the basis of the correction value to obtain a corrected image processing parameter as the image processing parameter to be used in said image conversion device; and (g) when the data representing the magnitude of the parameter adjuster is input into the second input unit plural times, calculating an average of a plurality of the corrected values obtained in said step (e) and supplying the averaged correction value to be corrected in said step (f).

20. A method in accordance with claim 19, said method further comprising the steps of:

(h) setting the image processing parameter inferred in said step (c) into said image conversion device; and (i) displaying an image responsive to the image recording data output from said image conversion device on a display device according to the image processing parameter set in said step (h);

(j) setting the corrected image processing parameter corrected in said step (f) into said image conversion device; and (k) displaying the image recording data output from said image conversion device on said display device according to the corrected image processing parameter set in said step (j).

21. A method in accordance with claim 20, said method further comprising the steps of:

(l) receiving an external operation instruction; and (m) selecting and activating one of the display of said step (i) and the display of said step (k) in response to the operation.

22. A method in accordance with claim 19, wherein said step (c) infers the image processing parameter according to a fuzzy logic.

23. A method in accordance with claim 19, wherein the keyword received in said step (b) includes a first keyword indicative of a type of an object of said original picture and a second keyword indicative of a finishing state of the image recording data.

* * * * *